United States Patent
Bodera et al.

(10) Patent No.: US 11,790,153 B2
(45) Date of Patent: Oct. 17, 2023

(54) SYSTEMS AND METHODS FOR CREATING AND MANAGING SMART HYPERLINKS

(71) Applicants: Atlassian Pty Ltd, Sydney (AU); Atlassian, Inc., San Francisco, CA (US)

(72) Inventors: Artur Pawel Bodera, Mosman (AU); Patrick Streule, Surry Hills (AU); Sascha-Manuel Reuter, Avalong Beach (AU); Pavel Aksenkin, Ashfield (AU); Scott William Simpson, Chatswood (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 16/716,896

(22) Filed: Dec. 17, 2019

(65) Prior Publication Data

US 2020/0202066 A1     Jun. 25, 2020

Related U.S. Application Data

(60) Provisional application No. 62/783,037, filed on Dec. 20, 2018.

(51) Int. Cl.
*G06F 40/134* (2020.01)
*G06F 16/955* (2019.01)

(52) U.S. Cl.
CPC ........ *G06F 40/134* (2020.01); *G06F 16/9558* (2019.01)

(58) Field of Classification Search
None
See application file for complete search history.

(56) References Cited

U.S. PATENT DOCUMENTS

| | | | |
|---|---|---|---|
| 9,824,406 B1 * | 11/2017 | Curtis | G06F 16/24 |
| 2008/0313215 A1 * | 12/2008 | Beker | G06F 16/986 |
| | | | 707/999.102 |
| 2011/0145688 A1 * | 6/2011 | Han | H04M 1/72561 |
| | | | 715/206 |
| 2015/0113019 A1 * | 4/2015 | Jiang | G06F 21/6227 |
| | | | 707/E17.108 |
| 2015/0235289 A1 * | 8/2015 | Jeremias | G06F 16/951 |
| | | | 705/26.41 |
| 2016/0262016 A1 * | 9/2016 | Tung | H04L 9/14 |

(Continued)

*Primary Examiner* — Kyle R Stork
(74) *Attorney, Agent, or Firm* — Brownstein Hyatt Farber Schreck, LLP

(57) ABSTRACT

Systems and methods for replacing a hyperlink to a referenced object with a smart link are disclosed. The method performed by a smart link management system includes receiving a content request for the hyperlink from a client device, the content request comprising a uniform resource locator (URL) of the referenced object, the URL indicating the location of the content; identifying a data source where the referenced object is located based on the URL; forwarding the content request to the data source; receiving metadata corresponding to the referenced object hosted by the data source; and forwarding the metadata to the client device for display on the client device in the form of a smart link, the smart link being a visual object including at least a portion of the metadata received from the data source.

20 Claims, 10 Drawing Sheets

(56) References Cited

U.S. PATENT DOCUMENTS

2016/0381135 A1* 12/2016 McGregor ............ G06F 21/445
  709/229
2017/0177194 A1* 6/2017 Lyons ..................... H04L 67/02

* cited by examiner

1000

1300

1400

SYSTEMS AND METHODS FOR CREATING AND MANAGING SMART HYPERLINKS

CROSS-REFERENCE TO RELATED APPLICATIONS; BENEFIT CLAIM

This application claims the benefit under 35 U.S.C. 119(e) of provisional application 62/783,037, filed Dec. 20, 2018, the entire contents of which are hereby incorporated by reference as if fully set forth herein.

TECHNICAL FIELD

Aspects of the present disclosure are directed to the creation and/or management of smart hyperlinks in electronic content.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

When creating content (such as documents, posts, comments, messages, blogs, etc.) users often reference additional content (e.g., an image, a document, a video, an article, and so on). This additional content is usually pre-existing and available at a different location, e.g., on a different platform or server. In order to reference this content, content creators typically include one or more 'hyperlinks' (i.e., HTML, objects) that, when interacted with, direct a user to the location where the additional content or information is available (i.e., typically a different webpage). As used herein, a 'hyperlink' refers to a directly followable reference for use within electronic content. Hyperlinks are typically highlighted or presented in a color different from their surrounding text to indicate to a user that the hyperlink may be accessed for additional content.

Although hyperlinks allow users to view the additional referenced content, they typically do not provide any information about the referenced content. Users have to select the hyperlink, which redirects the user to the location where the additional content is located. This involves redirecting the user's web browser to another webpage (typically by replacing the original web page with the web page that hosts the referenced content), loading the replacement page, and then redirecting the user's web browser back to the original web page once the user has interacted with the linked web page or object. The user typically then continues to peruse the original content.

This redirecting back and forth can be detrimental for user experience and can be intensive on system resources.

SUMMARY

The appended claims may serve as a summary of the invention.

Figure 1:
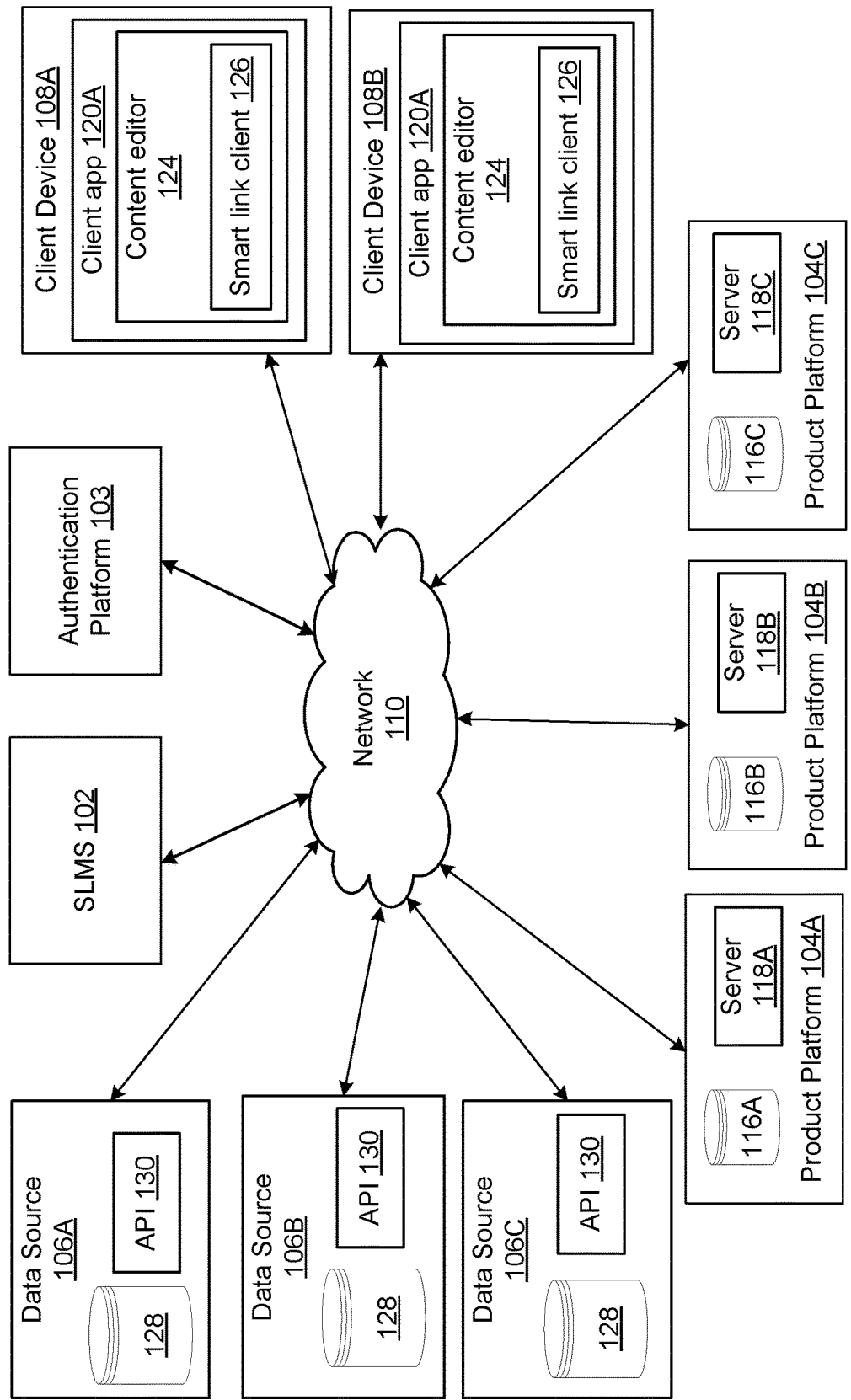
FIG. 1 is a block diagram of a networked environment according to some embodiments of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As described previously, typical hyperlinks do not provide any information about the referenced content. Users typically have to visit the webpage/location of the referenced content to know what information is provided. This redirecting of a user's web browser back and forth between hyperlinked content can be tedious and can negatively affect a user's experience.

To address one of more of these issues, embodiments of the present disclosure replace a hyperlink with a smart link (a visual representation of the referenced content), which can be inserted directly into content, thereby allowing a user to interact with the information available at the location referenced by the hyperlink within the context of the original content.

In particular, smart links are visual objects into which selected content from the referenced location can be added and displayed. Depending on the type of information available at the referenced location, smart links can be configured to display information deemed to be pertinent for a meaningful interaction. For example, if the referenced content is a document (e.g., a spreadsheet), the smart link may display a title of the document, the size of the document, when it was last modified, who has access to or has recently accessed the document, and an option to directly download the file from the smart link itself (without having to visit the location where the document is available). Alternatively, if the referenced content is a Jira task, the smart link may display the name of the task, when the task was created, the current status of the task, and an option to escalate the task (for example).

Figure 14:
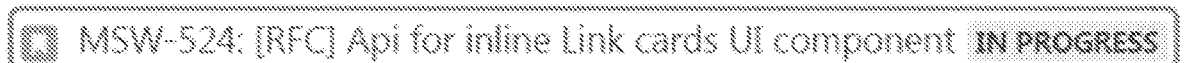
FIG. 14 is an example in-line smart link according to some embodiments of the present disclosure.

When a user wishes to add a smart link into their content, they simply enter the location of the content they wish to reference (e.g., by entering a uniform resource locator (URL)) directly into the content, e.g., via a content editor, and a smart link is automatically generated and inserted into the content. The smart link may be inserted in-line with the content, i.e., wrapped within text (e.g., see in line smart link 1440 in FIG. 14) in which case the smart link may provide limited information such as an icon and a title. In other cases, the smart link may be a block card (e.g., see FIG. 7) which is displayed by itself in the content. Block cards can obviously display more information about the referenced content. In certain embodiments, users may be able to switch between the inline and block card views. For example, if a user hovers over the inline smart link, a pop-up window with the block card may be displayed.

Further still, although smart links are provided to reduce or eliminate the need to leave a particular webpage/application and go to the referenced location, smart links typically also include functionality to allow the user to be redirected to the original URL. In case of inline smart links this may be performed, e.g., by selecting/clinking on the smart link. Block card smart links on the other hand may include the URL within the smart card.

Once a smart link is added to content, whenever a user views the original content, they can interact with the smart links inserted in the content (provided the user has access to the underlying content referenced by the smart link). This way, a user's web browser does not have to redirect the user to the location where the referenced content is located. Instead, the user can directly interact with the content in the context of the current content the user is viewing.

These and other aspects of the present disclosure will be described in detail with reference to FIGS. 1-14 below.

Environment Overview

FIG. 1 illustrates an environment 100 in which one or more aspects of the present disclosure are implemented. Specifically, FIG. 1 illustrates the systems involved in creating, and managing smart links. The systems include a smart link management system (comprising server-side components referred to as a smart link management server (SLMS) 102 and an authentication platform 103 and a client-side component referred to as a smart link client 126), product platforms (e.g., product platforms 104A, 104B and 104C, collectively referred to as product platforms 104), data sources (e.g., data sources 106A, 106B, and 106C, collectively referred to as data sources 106), and client devices (e.g., client devices 108A, 108B, and 108C, collectively referred to as client devices 108). The SLMS 102, product platforms 104, data sources 106, and client devices 108 communicate with each other over one or more communication networks 110.

The SLMS 102 is configured to receive and service requests for smart links. In particular, it is configured to communicate with the product platforms 104 to service requests for adding or viewing smart links and with the data sources 106 to receive data for the smart links.

In case the smart link is requested for restricted content, the SLMS 102 interacts with the authentication platform 103 to enable authorization of the user and retrieve permission to access the restricted content hosted on the data sources 106. In order to perform these functions, the SLMS 102 and the authentication platform 103 include a number of subsystems and modules, which will be described in detail with respect to FIG. 2.

In general, each product platform 104 is a system entity that hosts one or more software applications and/or content. Each platform 104 may include one or more servers (e.g., 118A, 118B and 118C) for hosting corresponding software application(s) and one or more storage devices (e.g., storage devices 116A, 116B and 116C) for storing application specific data. Examples of software applications hosted by product platforms 104 may include interactive chat applications (e.g., Slack™, Stride™), collaborative applications (e.g., Confluence™), software code management system (e.g., Bitbucket™), and issue tracking applications (e.g., Jira™). Jira, Confluence, BitBucket, and Stride are all offered by Atlassian, Inc. It will be appreciated that the software applications need not be offered by the same organization and that the presently disclosed invention can be used with any product platform configured to interact with the SLMS 102.

In order to run a particular application, the server 118 includes one or more application programs, libraries, APIs or other software elements that implement the features and functions of the application. In one example the product server 118 includes a content rendering module (not shown) which provides content rendering functionality as described in detail below.

The product platforms 104 also store product data. Product data generally includes: data defining the operation of the hosted application (for example, user accounts, user permissions, and the like); and application data (i.e., the content hosted/maintained by the application, which can be, for example, issue data (in Jira), page/document data (in Confluence), conversation and chatroom history (in HipChat and Stride), etc.). The data is stored on and managed by database 116. Database 116 is provided by a database server which may be hosted by server 118, but is more typically hosted on a separate physical computer in communication (directly or indirectly via one or more networks) with the server 118.

While single server architecture has been described herein, it will be appreciated that one or more of the product platforms 104 can be implemented using alternative architectures. For example, in certain cases a clustered architecture may be used where multiple server computing instances (or nodes) are instantiated to meet system demand. Conversely, in the case of small enterprises with relatively simple requirements a product platform 104 may be a stand-alone implementation (i.e. a single computer directly accessed/used by the end user).

The data sources 106 host content and make this content available to one or more users on client devices 108. In the present disclosure, the SLMS 102 is configured to retrieve content for smart links from the data sources 106. The data sources may be external data sources (i.e., hosted by third parties) or internal sources (i.e., hosted by organizations that provide the product platforms, or organizations that use the product platforms). Examples of external data sources may include systems that host the latest weather data, stock prices, movie reviews, song lyrics, memes, etc. Examples of internal data sources may include employee databases, finance spreadsheets, team structure databases, etc.

The data sources 106 include an API module 130 via which the SLMS 102 can communicate with the data sources and in particular may requests for content and/or provide instructions to perform actions on the content. Some data sources 106 may be publicly accessible—i.e., the information available at the data sources 106 may be available for anybody to view. Alternatively, some data sources 106 may store at least some private/sensitive information that is restricted to certain individuals/teams, etc. In case the data sources host private/sensitive information, the data sources may also include an authorization service (not shown) that may be utilized to grant permission to the SLMS to perform actions and retrieve content on behalf of users. This authorization service may communicate with the authentication platform 103 to grant permissions when the SLMS polls the data source 106 to retrieve data for a particular smart link. In addition to the authorization service, the data source may also include a permissions database 128, which stores information about the permissions granted by the data source to one or more entities (including the smart link management system) to view and retrieve data on behalf of data source users.

Client devices 108 may be any device suitable for performing client-side operations described herein, for example a mobile device (e.g. a tablet or mobile phone), a portable device (such as laptop computer), or any other computing device (e.g. a desktop computer).

Generally speaking, users of client devices 108 are associated with one or more user accounts and generate and/or view electronic content on one or more product platforms 104. This activity includes any type of user account interaction with the product platforms 104, including interaction with content and/or software applications hosted by the product platforms 104. Example interactions include accessing/viewing and/or contributing to one or more documents hosted by the product platforms, writing posts, commenting on content, visiting web pages, sharing, liking, or viewing content, communicating with user accounts in real-time chat interfaces, etc.

In order to allow users to perform these functions, as illustrated in FIG. 1, each client device 108 includes one or more client (software) applications (e.g., client applications 120A and 120B) that are configured to access software applications made available by product platforms 104. In some cases, the client devices 108 may include a client application corresponding to each product platform 104 the client device 108 has access to. In other cases, a single client application (e.g., a web browser) may be utilized to communicate with multiple product platforms.

The client applications 120 include instructions and data stored in the memory (e.g. non-transient compute readable media) of the client devices 108 on which the applications are installed/run. These instructions are executed by a processor of the client device 108 to perform various functions as described herein. By way of example, some functions performed by the client applications 120 include communicating with applications hosted by the product platforms 106, rendering user interfaces based on instructions received from those applications, receiving inputs from user to interact with content hosted by product platforms 104.

The client application 120 may be implemented in various ways. For example, the client applications may be web browser applications (such as, for example, Chrome, Safari, Internet Explorer, Opera) which access the applications hosted by the product platforms 106 and/or SLMS 102 via appropriate uniform resource locators (URL) and communicate with these systems via general world-wide-web protocols (e.g. HTTP, HTTPS, FTP). In this case the web browser application is configured to request, render and display user interfaces that conform to a markup language such as HTML, XML or extensions, and may be capable of internally executing browser-executable code such as JAVASCRIPT, or other forms of code. Alternatively, the client applications may be specific applications programmed to communicate with the product platforms 106 and/or SLMS 102 using defined application programming interface (API) calls.

The client applications 120 include content editors 124, i.e., interfaces for allowing users to create content, such as webpages, issues, conversations, posts, comments, etc. In some cases, content editors 124 may use an iframe element for the content creation area. When a user clicks in the iframe, they can enter text, images or any other content in the iframe and once the user is done, they can submit the text so that the particular user interface currently displayed can be updated with the content submitted by the user.

According to the present disclosure, the content editor 124 includes a smart link client 126, which is configured to detect when a user enters a reference to an external resource (e.g., a URL) in the content editor 124, generate and render a smart link, communicate a request for data for the smart link to the SLMS 102, retrieve data for the smart link from the SLMS 102, convert the received data into visual data appropriate for the smart link and populate the smart link with this data. In addition, the smart link client 126 may also be configured to switch between different types of smart link views (such as inline or block cards) based on user input, and aid in authentication of a user if the smart link includes restricted content.

As illustrated in FIG. 1, communications between the SLMS 102, authentication platform 103, client devices 108, product platforms 104, and data sources 106 are via the communications network 108. The communication network 110 is depicted as a single network in FIG. 1 for ease of depiction. However, in actual implementation, the various systems illustrated in FIG. 1 may communicate with each other over different communication networks. For example, the SLMS 102 may communicate with the authentication platform 103, product platforms 104 and internal data sources through a local area network (LAN), whereas it may communicate with the client devices 108 and external data sources via a public network (e.g., the Internet). Similarly, the product platforms 104 may communication with one or more client devices 108 via a LAN and with other client devices 108 via a public network without departing from the scope of the present disclosure. Furthermore, the SLMS 102, authentication platform 103, product platforms 104 and data sources 106 may communicate with each other over open web protocols such as (HTTPS, REST, and JWT).

It will be appreciated that although only two client devices (108A and 108B), three product platforms (104A, 104B and 104C) and three data sources (106A, 106B, and 106C) have been depicted, in normal operation, many more client devices 108, data sources 106 and product platforms 104 may be connected to the identity platform through the network 110. Furthermore, it will be appreciated that in some cases users may wish to create smart links to content hosted on one or more product platforms 104 and in such cases the product platforms 104 may be the data sources 106.

System Architecture

Figure 2:
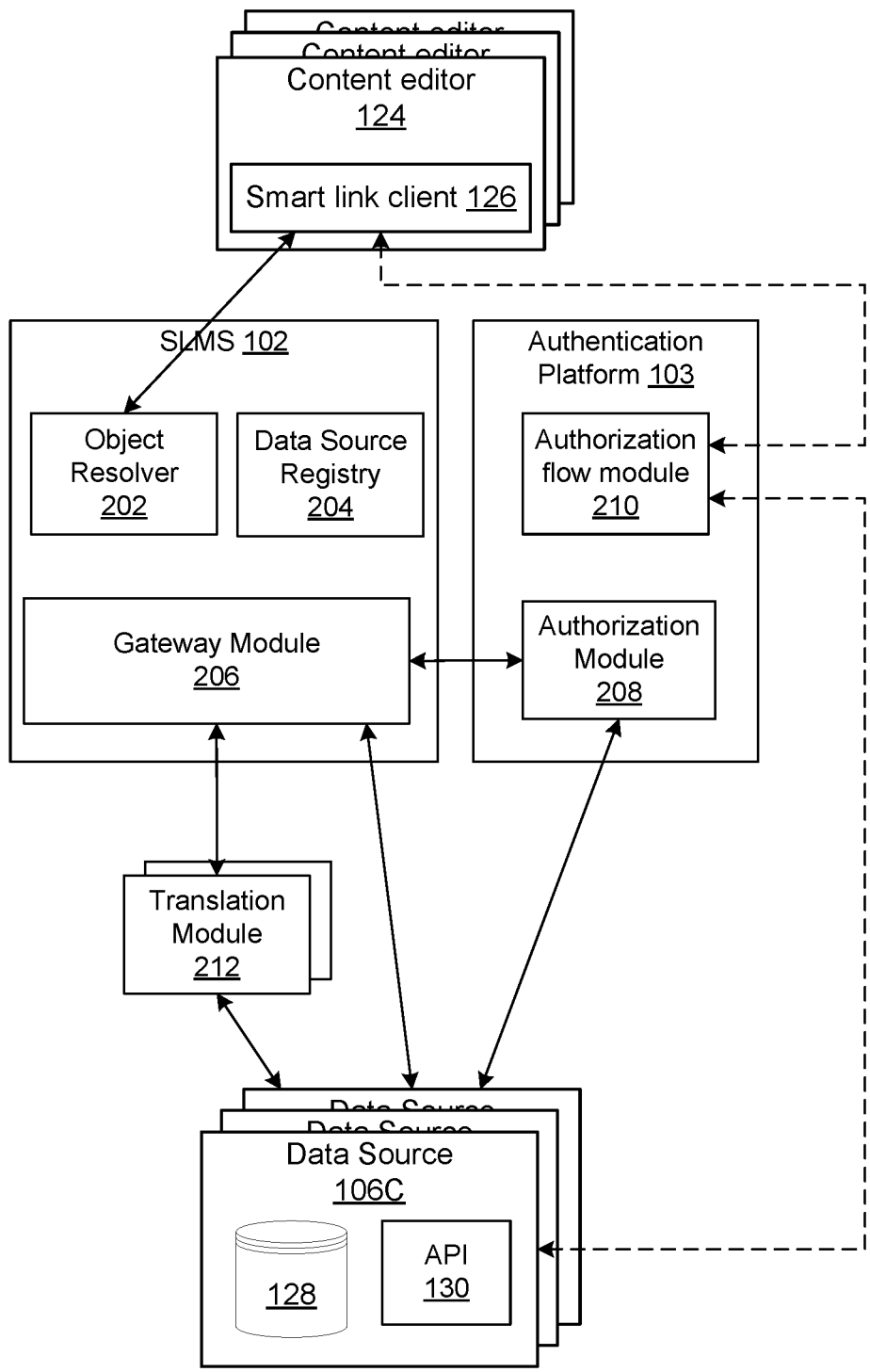
FIG. 2 is a block diagram of a smart link management system according to various embodiments of the present disclosure.

FIG. 2 illustrates the subsystems and modules of the smart link management system and the authentication platform 103. In general, the SLMS 102 includes an object resolver 202, a data source registry 204, and a gateway module 206. The authentication platform 103 includes an authorization module 208 and an authorization flow module 210. In addition, FIG. 2 illustrates that the content editors 124 and the smart link client applications 126 communicate with the SLMS 102 via the object resolver 202 and with the authentication platform 103 via the authorization flow module 210. Similarly, the data sources 106 are in communication with the gateway module 206 of the SLMS 102 and with the authorization module 208 of the authentication platform 103.

Generally, speaking, data sources 106 maintain their content in many different ways. For example, some data sources may store content in a fragmented manner, other data sources may store their data in an unstructured format whereas still other data sources may store their data in a structured format. Even within these different methodologies, the data sources 106 may utilize different standards, languages, or schemas for storing their content. The smart link management system however is configured to consume data in a particular format. To account for this, one or more data sources 106 (e.g., the data sources that do not store their data in the same format as that used by the smart link management system) may further be associated with their respective translation modules 212. A translation module 212 is a stateless service that communicates with the SLMS 102 and its respective data source 106 and translates the communications between these entities into languages/formats that are understandable to the respective entities. For example, the translation module 212 associated with a particular data source 106 may be configured to receive content requests from the SLMS 102 and forward these requests to the data source 106 (e.g., in a language understood by the data source). It may also be configured to receive responses (including content and error messages) from the data source 106 and forward these to the SLMS 102 (e.g., in a language understood by the SLMS 102).

In certain embodiments, the smart link management system is configured to receive content from the data sources in a structured format and preferably using the JavaScript Object Notation for Linked Data (JSON-LD) schema. In these embodiments, the translation module 212 is configured to retrieve content from its respective data source and convert this into a JSON-LD file and forward it to the SLMS 102.

The object resolver 202 is configured to communicate with the content editors 124 to receive smart link requests and service these requests. In particular, the object resolver 202 is configured to resolve a URL to determine whether the SLMS 102 supports the data source 106 from which content is to be retrieved.

The data source registry 204 maintains a list of data sources 106 that are supported by the SLMS 102. In certain embodiments, the registry 204 maintains descriptors of third party data sources 106 that have agreed to provide content via smart links.

In certain embodiments, the data sources 106 can communicate with the SLMS 102 to initiate smart links. In this case, the SLMS 102 may provide an interface to the data source 106 to provide information for storing in the data source registry 204. The SLMS 102 records the information in the form of a data source descriptor in one or more data structures. Each descriptor may store relevant information for retrieving content from the data source 106.

For example, for a unique data source descriptor, the SLMS 102 may store the following information:

Identifier (ID): that uniquely identifies the data source.

Data source name: the name of the application or service—e.g., Google Spreadsheets, Asana, Trello dashboards, etc.

Domain name(s): one or more domain names associated with the data source.

Restricted flag: a flag that indicates whether the data source is a restricted data source or not. As referred to herein, a restricted data source is a data source that includes content that is restricted to one or more users and not available publicly. Examples of restricted data sources include web collaborative document management systems such as those offered by Google Spreadsheets® and Dropbox®, and collaborative management systems such as those offered by Asana® and Trello®. It will be appreciated that not all content available on a restricted data source is restricted. In fact, restricted data sources may also host content that is available publicly. Public data sources on the other hand store only publicly available content. Examples of public data sources include Wikipedia®, Webster dictionary, etc. Even if a data source may offer some publicly available content, if restricted content is also hosted on the data source, this flag is selected.

A resolve URL: this is the location that can be addressed by the SLMS 102 to submit content requests. In case the data source is associated with a translation module 212, this URL points to the translation module 212. Otherwise, it may point to an API of the data source which can service content requests.

An Action URL: this is the location that can be addressed by the SLMS 102 to inform the data source if any actions are to be performed on the underlying content through the smart link. For example, if the smart link includes an option to approve/reject a particular action to be completed on a Trello™ board, if the user viewing the smart link decides to approve/reject the action, this information is forwarded to the data source via the action URL so that the data source 106 can update its content accordingly. As with the resolve URL, in case the data source is associated with a translation module 212, this URL points to the translation module 212. Otherwise, it may point to an API of the data source which can service action requests.

A container ID: This is a unique identifier for a container assigned to the data source by the authentication platform 103 in which configuration information for authenticating users may be stored. It will be appreciated that this field is used for restricted data sources and may not be used for public data source. In certain implementations, the container ID is assigned by the authentication platform 103 or the SLMS 103 when the data source descriptor is created.

The data structures and fields described are provided by way of example. Depending on the implementation, additional, fewer, or alternative fields may be used. Further, the fields described in respect of a given data structure may be stored in one or more alternative data structures (e.g. across multiple linked data structures). Further still, although tables are used to illustrate the data structures, the relevant fields/information may be stored in any appropriate format/structure.

The gateway module 206 is typically in communication with subsystems of the SLMS (such as the object resolver 202 and the data source registry 204) and with the subsystems of the authentication platform 103. It is also configured to communicate with third party data sources 106. In particular, the communications between the gateway module 206 and the object resolver 204 include receiving and servicing content requests and/or receiving information from the object resolver if any actions are undertaken via the smart link. The gateway module 206 communicates with the data source registry 204 and the authentication platform 103 to retrieve access keys for requesting restricted content from external data sources 106. Finally, it communicates with the external data sources 106 to retrieve content and/or provide information back to the data sources 106 if any actions were undertaken on the content by a user via their product platform 104.

The authorization module 208 is configured to communicate with the data sources to receive permission for accessing user content from the data sources on behalf of the users. It is also configured to store the permissions granted to the SLMS 103 to retrieve restricted content from the data sources on behalf of users. In particular, it stores access keys (e.g., tokens or passwords) that may be used to retrieve content from the data sources. Typically, an access key uniquely identifies a particular user, a particular party requesting access on behalf of the user (SLMS 102 in this case), and/or what permissions the user has agreed to give to the requesting party. When a user first requests a smart link to be added or requests to view a smart link associated with restricted content, the user is requested to log-in to their account maintained by the data source 106 and consent to the SLMS 102 contacting the third party data source on their behalf to retrieve restricted content from the data source 106 that the user has access to. When the user does this, an authorization server (not shown) associated with the data source 106 generates an access key that indicates that the SLMS 102 is authorized to retrieve content from the data source 106 (that the user has access to) on behalf of the user. This access key is stored by the authorization module 208 against the user ID.

In certain embodiments, the authorization module 208 maintains containers for each data source 106 it supports—each container uniquely identified by a container ID. Further, each container includes authentication information pertaining to the particular data source it is associated with.

For example, in a unique data source container, the SLMS 102 may store the following information:

A client ID: that uniquely identifies the entity requesting authorization on behalf of the user. In this case, the client ID is the ID of the SLMS 102.

A secret: is a passphrase or a secret known only to the entity requesting authorization on behalf of a user and the authorization server of the data source. This is typically stored in an encrypted or hash form.

User IDs: this is a list of user ID of users of the SLMS 102 or the product platforms 104 that have authorized the SLMS 102 to retrieve content from the data source on their behalf.

Authorization URL: this is the URL of the data source's authorization server to which the client device 108 has to be redirected so that the user can be authenticated and can consent to authorizing the SLMS 102 to retrieve content on its behalf.

Exchange URL: Once the user provides consent, the authorization server of the data source generated a one-time token/code. The authorization module 208 has to then exchange this one time token/code for an access key. The exchange URL is the URL of the data source's authorization server which the authorization module has to contact to retrieve the access key.

Profile URL: this URL points of the location in the data source server where the user's profile information can be retrieved. This is useful in case a user maintains multiple accounts with the data source and wishes to authorize the SLMS 102 to retrieve content from the data source associated with multiple accounts maintained by the user with the data source.

The permissions database 128 of the data source also stores a copy of the access keys it has generated and assigned to different entity and user account pairs.

A user may modify/cancel these permissions at any time. If this happens, the corresponding data source 106 and the authorization module 208 are configured to delete the access keys. Further, the access keys may expire after a given time. In this case, the authorization module 208 may request the data source to reissue a new access key. In one example, the access keys may be generated and handled according to an authorization protocol such as the OAuth 2.0 protocol.

The authorization flow module 210 allows a user to authorize SLMS 102 to retrieve content from data sources on behalf of the user. When authorization is required (e.g., because SLMS 102 does not have permission to retrieve content on behalf of the user), the smart link client 126 communicates with the authorization flow module 210, which in turn redirects the user to the data source's authentication web page (hosted on the authorization URL), where the user can login (if required) and consent to giving SLMS 102 the permissions to access content. When the user is authenticated and has consented, the data source generated a one-time code/token, which is forwarded back to the authorization flow module 210. The authorization flow module 210 in turn provides this token to the authorization module 208, which exchanges this token for an access key from the data source 106.

Hardware Overview

The operations/techniques described herein are implemented by one or more special-purpose computing systems or devices. For example, in environment 100: the SLMS 102 may be provided by one or more computer systems; the authentication platform 103 may be provided by one or more computer systems; each product platform 104 may be provided by one or more computer systems; each client device 108 is a computer system; and each of the data sources 106 are provided by one or more computing systems.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 3:
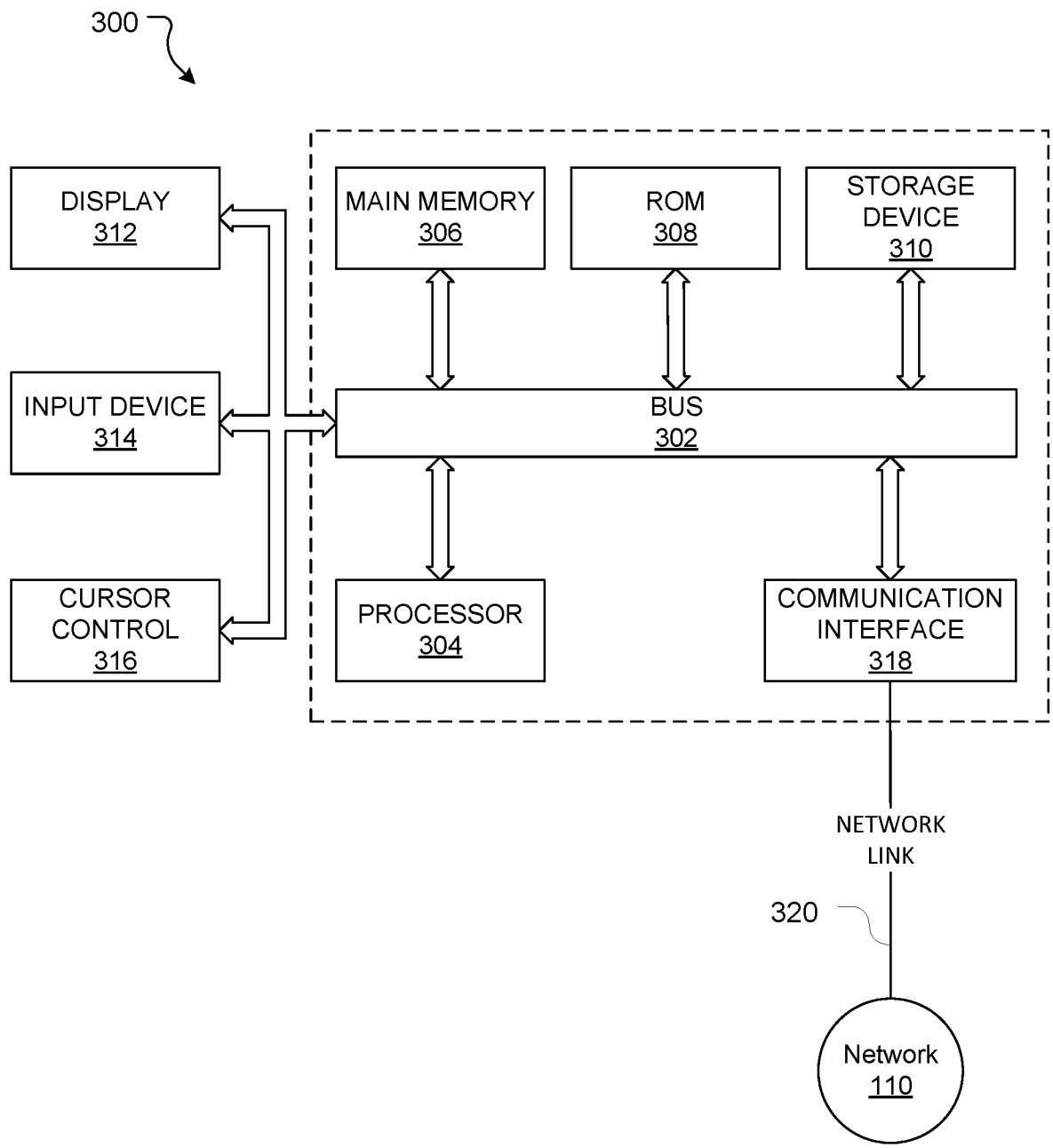
FIG. 3 is a block diagram of a computing system with which various embodiments of the present disclosure may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general-purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 210, such as a magnetic disk or optical disk, is provided and coupled to bus 302 for storing information and instructions. If the computer system 300 is part of the SLMS 102, the storage device 310 may store the data store registry 204.

In case the computer system 300 is the client device 108, it may be coupled via bus 302 to one more output devices such as a display 312 for displaying information to a computer user. Display 312 may, for example, be a cathode ray tube (CRT), a liquid crystal display (LCD), a light emitting diode (LED display), or a touch screen display. An input device 314, including alphanumeric and other keys, may be coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that permits the device to specify positions in a plane. Additional and/or alternative input devices are possible, for example touch screen displays.

According to one embodiment, the methods disclosed herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to network 110. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks 110 to other computing systems. For example, if the computing system 300 is part of the SLMS 102, the network link 320 may provide a connection through network 110 to client devices 108, data sources 106 or product platforms 104.

Computer system 300 can send messages and receive data, including program code, through the network(s), network link 320 and communication interface 318. In the SLMS example, the object resolver 202 may receive smart link requests from the product platform 106A through the network 110 and communication interface 318.

Exemplary Methods

This section describes various methods and processes for creating, viewing, and interacting with smart links. Generally speaking, the process for viewing and creating smart links is similar. In one case the content editor 124 detects a URL typed in the content editor whereas in the other case the product platform viewer identifies a URL/smart link placeholder in the content being viewed. From that point, the processes for creation and viewing are the same and therefore only one process—i.e., a process for displaying a smart link is described here. In addition to viewing smart links, users may interact with these smart links, e.g., by requesting an action to be performed. A method for interacting with a smart link is also therefore described. For descriptive purposes, these processes will be described independently. However, in some embodiments these processes can be joined, such that the output of one process is the input for another process.

Displaying Smart Links

Figure 4A:
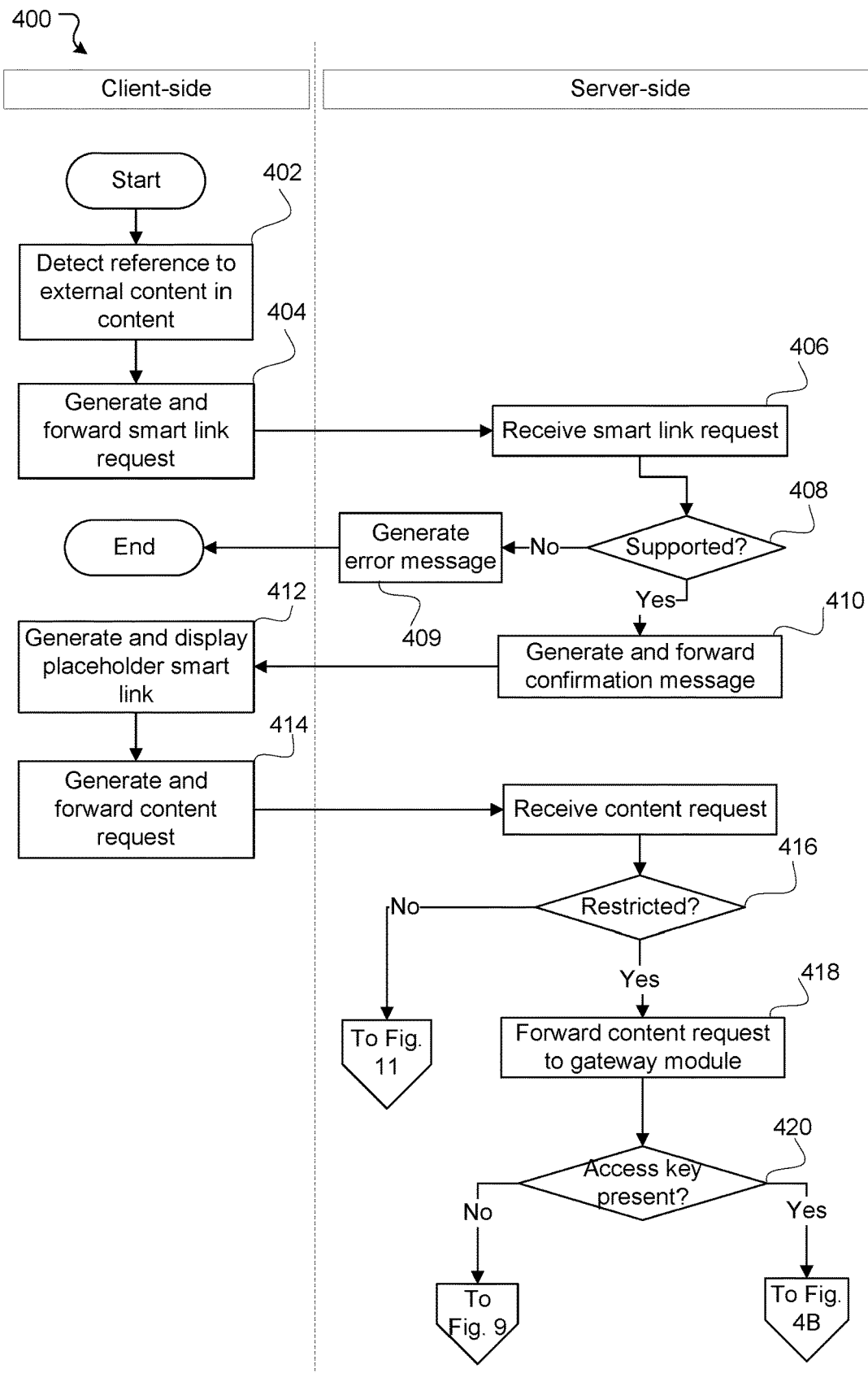
FIG. 4A and FIG. 4B are a flowchart illustrating a method for displaying smart links according to some embodiments of the present disclosure.
Figure 4B:
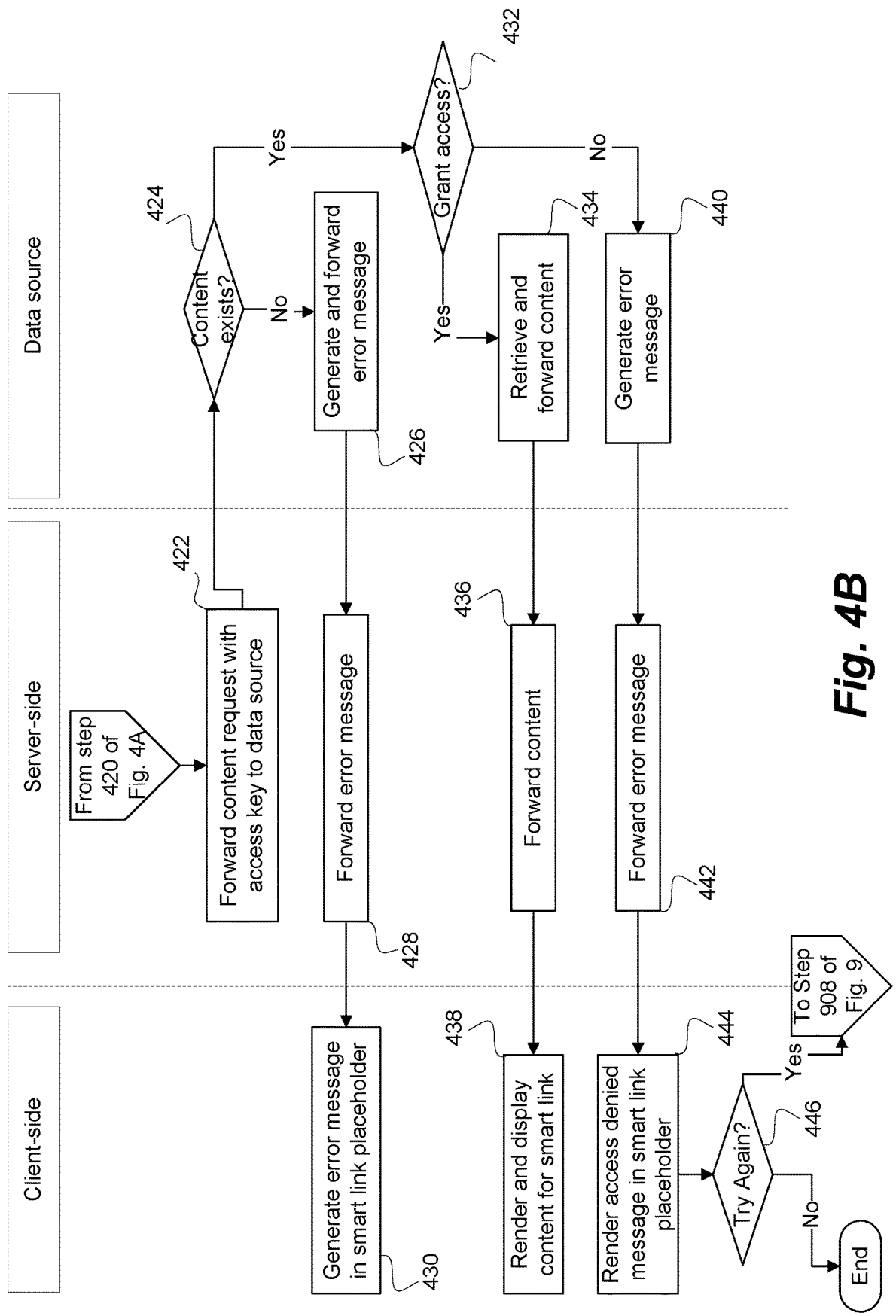

FIG. 4A and FIG. 4B (collectively referred to as FIG. 4) illustrate an exemplary method 400 for displaying smart links. Although method 400 is described with reference to a single smart link, it will be appreciated that in practice this method can be repeated for displaying other smart links as well. In this example, operations of method 400 that are described as being performed by the client device 108 are performed by the client device 108 under control of the content editor 124 and smart link client application 126. Similarly, operations of method 400 described as being performed by server-side components are performed by the various subsystems and modules of the SLMS 102 and the sub-systems of the authentication platform 103, and operations described as being performed by the data source 106 are performed by the API module 130 of the data source 106 and/or the translation module 212 (if present).

The method begins at step 402, where the client device 108 detects a reference to external content in content that is currently rendered on the display of the client device 108. This detection can occur when a user is creating content (e.g., when the user is using content editor 124) and it can happen in a number of different ways. In one example, a user may be in the middle of creating content via the content editor 124 and may insert/type a URL or hyperlink in the content editor 124. The content editor 124 detects the URL, which invokes the smart link creation process. In another example, the content editor 124 may include a graphical interactive element such as an icon or button to invoke the smart link creation process. In this case, the user may type/insert the URL and select the graphical element to initiate the process.

Once the client device 108 detects a reference to external content, it generates a smart link request at step 404. Initially, this request may include the identified reference (e.g., the URL). Once generated, the request is forwarded to the SLMS 102.

At step 406, the SLMS and in particular the object resolver 202 receives the smart link request. The job of the object resolver 202 is to resolve the URL—i.e., retrieve content associated with the URL from the data source 106. To do this, the object resolver 202 first determines whether the SLMS 102 supports the data source associated with the URL. This is done at step 408.

In one example, the object resolver 202 parses the URL to identify a domain name present in the URL. It is well understood that URLs typically follow a standard syntax including a root or top level domain name (e.g., www.example.com), which can sometimes be followed by subdomain names, etc. Accordingly, any known techniques may be utilized to identify the domain name within the received URL. The object resolver 202 also retrieves descriptors of data sources maintained in the data sources registry 204 at this step. It then compares the identified domain name of the particular URL with the 'domain name' field of the retrieved data source descriptors.

If the identifier domain name does not match the domain names of one or more data source descriptors, the object resolver 202 determines that the URL belongs to a data source 106 that is not supported by the SLMS 102. In this case, the method proceeds to step 409, where the object resolver 202 generates an error message (e.g., a 'false' output) and forwards it to the client device and the method ends. The content editor may simply continue to display the original hyperlink.

Alternatively, if at step 408, the identified domain name matches the domain name of one of the data source descriptors, the object resolver 202 determines that the URL belongs to a data source 106 that is supported by the SLMS 102. In this case, the method proceeds to step 410, where the object resolver 202 generates a confirmation message (e.g., a 'true' output) and forwards the confirmation to the client device 108. The confirmation message is generated to inform the client device 108 that the URL is resolvable and the object resolver 202 will proceed to try and resolve the URL.

Figure 5:
FIG. 5 is an example smart link placeholder according to some embodiments of the present disclosure.

At the client device 108, once the confirmation message is received, the smart link client application generates a smart link placeholder and renders it for display on the client device 108 at step 412. This improves user experience as the user understands that the SLMS 102 is performing tasks in the background to resolve the URL and has not simply crashed/stopped working. As described previously, the smart link may be in-line with the text (i.e., similar to a regular hyperlink) or a block card that is displayed separately. The content editor may include an option to select the type of smart link card a user wishes to view/include. At this step, the smart link client application may generate either an inline smart link placeholder or a block smart link placeholder depending on the type of smart link the user has selected (either by default or manually when entering the URL). FIG. 5 illustrates an example in-line smart link placeholder 500 that is generated and rendered on the client device display 312 at this step. It will be appreciated that the user can toggle between the in-line and block card views, e.g., using the selection option in the content editor. Similarly, when viewing content, the user may be able to toggle between the inline and block card views by interacting with the smart link (e.g., hovering over it, double clicking, right clicking, etc.).

Returning to FIG. 4, in response to receiving confirmation that the URL is supported by the SLMS 102, the smart link client application 126 also generates a content request for the smart link and forwards this request to the SLMS 102 at step 414. This request includes the URL that needs to be resolved and some information to help the SLMS 102 to identify the user that generated the content request. In some cases, this information may be a user ID. In other cases, this information may be a session token (e.g., a cookie) associated with the particular user which can be converted by a proxy service (not shown) located between the client device 108 and the object resolver 202 into a user ID of the user associated with the session token.

Upon receiving the content request and the user ID (which may be included as part of the content request or not), the object resolver 202 determines whether the data source is public data source or a restricted data source (at step 416). This determination is made because the processes for retrieving content from a public data source and a restricted data source are different. To retrieve content from a public data source, the SLMS 102 does not need to communicate with the authentication platform 103 and/or perform an authentication/authorization check, whereas this is needed in case content is required from a restricted resource.

In one embodiment, the object resolver 202 determines whether the data source is a public data source or a restricted data source by performing a lookup in the descriptor of the data source (e.g., looking up the 'restricted content flag' field in the descriptor) identified at step 408. If the restricted content flag is not activated, the object resolver 202 determines that the data source is a public data source. Conversely, if the restricted content flag is activated in the descriptor, the object resolver 202 determines that the data source is a restricted data source.

If, at step 416, a determination is made that the data source is public, method 1100 is activated. Alternatively, if a determination is made that the data source is restricted, the object resolver 202, requests the gateway module 206 to retrieve content from the associated data source at step 418. This request may include the URL for which content is requested, the user identifier, and the data source identifier of the corresponding data source (retrieved from the data source registry 204).

At step 420, the gateway module 206 determines if any access keys are available for the particular pair of user identifier and data source identifier received from the object resolver 202. In certain embodiments, to do this, the gateway module 206 provides the user identifier and data source identifier to the authorization module 208, which checks if any access keys are available for this pair of identifiers.

In other embodiments, the authorization module 208 may not be aware of data source identifiers, but instead may store access keys against container IDs for data sources. In such cases, instead of providing the data source ID to the authorization module 208, the gateway module 206 retrieves a container ID corresponding to the data source ID from the data source registry 204 and forwards this container ID along with the user ID to the authorization module 208, which checks if any access keys are available in the container associated with that container ID for the provided user ID.

If an access key is found, it is returned to the gateway module 206. Otherwise, the authorization module 208 may inform the gateway module 206 that no access keys exist for that pair of user/data source identifiers.

Accordingly, if it is determined at step 420 that access keys are not available, method 900 is activated. Alternatively, if it is determined at step 420 that access keys are available, the method proceeds to step 422 where the gateway module 206 generates and forwards a content request to the data source 106 or the translation module 212. This request includes the URL for which content is required and the available access key. In one example, the gateway module 206 may use an HTML POST message to forward the request to the data source and Table A illustrates an example body of the POST message.

TABLE A

Example content request message

```
{
    "_meta": {
        "tokens": [
            { "token": "USER ACCESS TOKEN" },
        ]
    },
    "body": {
        "resourceUrl": "https://url.to.be/resolved"
    }
}
```

Typically, a translation module 212 or data source 106 may provide a particular endpoint for servicing content requests for smart links. This endpoint, also referred to as a resolve URL, is available in the data source's descriptor stored in the data source registry 204. The gateway module 206 retrieves the resolve URL from the data source registry 204 and forwards the content request to the endpoint corresponding to the resolve URL. If the resolve URL points to the translation module 212, the translation module 212 forwards the request to the data source at this step.

At step 424, the data source 106 determines whether the content for that URL is still available (e.g., whether the content has been removed and/or whether the content has been deleted). If the content has been deleted, an error message is generated and forwarded back to the gateway module 206 (either directly or via the translation module 212) at step 426.

Figure 6:
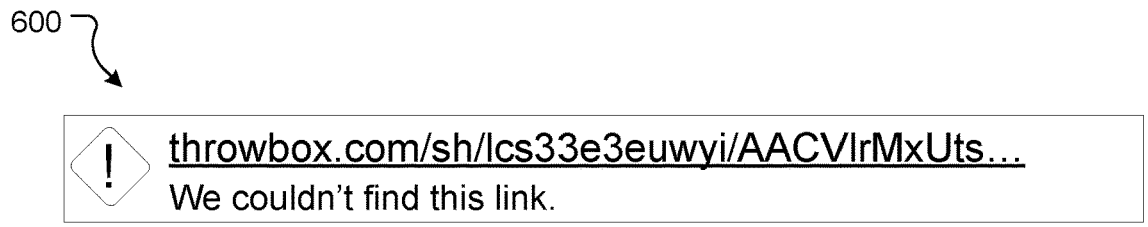
FIG. 6 is an example smart link placeholder according to some embodiments of the present disclosure.

This error message is routed back to the object resolver 202 and the smart link client application 126 at step 428. The client application 126 in turn displays an error message in the smart link placeholder at step 430 informing the user that the link cannot be found. FIG. 6 illustrates an example smart link placeholder 600 with the error message.

Returning to FIG. 4, if at step 424, it is determined that content for that URL is still available, the data source 106 determines whether access should be granted to the content (at step 432). In a particular embodiment, the data source 106 checks if the access key present in the content request is sufficient to grant access to the corresponding URL.

As described previously, the data source 106 maintains a permissions database 128 that includes access keys and corresponding permissions associated with those access keys. Accordingly, at this step, the data source 106 compares the received access key with the access keys stored in its permission database 128 (and their associated permissions) to determine whether the SLMS 102 has permission to view/retrieve this particular content. If the permission corresponding to the received access key is sufficient to grant access to the content of the URL, the data source 106 determines that access should be granted at step 432 and the method proceeds to step 434 where the data source 106 forwards content associated with the URL to the gateway module 206.

If the data source 106 stores its data in the format suitable for the SLMS 102, the data source 106 may simply create a metadata file and forward it to the gateway module 206 at this step.

On the other hand, if the data source does not store its data in the format required by the SLMS 102, the data source 106 communicates with translation module 212 at this step to forward metadata about the URL to the SLMS 102. In certain embodiments, the translation module 212 may receive an initial set of data from the data source and generate a metadata file (e.g., a JSON-LD file) from this data. If the initial set of data is not sufficient to create the metadata file (e.g., because information pertaining to certain fields is not provided in the initial set of data), the translation module 212 may query the data source one or more times to retrieve further data to prepare the metadata file. Once the translation module 212 has received sufficient information about the URL from the data source 106, the translation module 212 may package the metadata, e.g., in the JSON-LD file, and forward the metadata file to the gateway module 206.

Table B illustrates an example of a JSON-LD formatted structured response for a particular Confluence page.

TABLE B example JSON-LD metadata

```
{
    "meta": {
        "visibility": "restricted"
        "access": "granted"
    },
    "data": {
        "@context": "https://www.w3.org/ns/activitystreams",
        "@type": "Document",
        "name": "[name of the document]",
        "context": {
            "type": "Application",
            "name": "Confluence"
        },
        "attributedTo": {
            "type": "Person",
            "name": "[Person name]"
        },
        "image": {
            "type": "Image",
            "url": "[URL for the image]"
        },
        "summary":
            "A proposed approach for representing objects that get
            rendered into Cards",
        "published": "2017-03-05T12:12:12Z",
        "updated": "2017-03-05T12:12:12Z",
        "url": "[URL for the webpage]"
    }
}
```

In this example, the metadata includes:

Meta.Visibility: this field indicates the visibility status of the resource. Options include public (i.e. visible to user, no authorization required), restricted (authorization is required), not found (i.e., the object does not exist), or forbidden (i.e., the user does not have permissions to see the resource).

Meta.access: this field indicates the current access level to a restricted resource. Options include: unauthorized (i.e., not accessible without authentication), forbidden (not accessible to the user even after authentication), or granted (i.e., access granted)

@Context: this field provides context for the information provided in the "data" section. For example, it may point to a webpage which provides definitions for the fields used in the "data" section.

@Type: this field indicates the type of content available at the URL. In this example, the Confluence page is classified as a 'document'. In other cases, e.g., if the URL hosts a video, the type can be 'video' and if the URL hosts a source code repository, the type can be 'repository' and so on.

Name: this field indicates what the content is—i.e., its name or title.

Context: this field indicates the data source associated with the content and can further include the fields 'type' which indicates what the data source is and 'name' which indicates the name of the data source. In this example, the type is an application and the name of the data source is Confluence.

Attributed to: this includes details about the author of the URL, including the type of the author (e.g., whether it is a person, a team, an organization) and a name of the author (e.g., name of the person, the team or the organization).

Image: this field includes a URL for any images present on the webpage or any images that the data source would like to be displayed in the smart link.

Summary: this field includes a short blurb about the content of the URL.

Published: indicates when the content on the URL was first published.

Updated: indicates when the webpage was last updated.

URL: includes the URL for the webpage

It will be appreciated that these fields are merely exemplary and depending on the type of data hosted on a data source, the fields may vary slightly or drastically from the fields illustrated in the example above. For example, in case the URL points to a repository, the metadata may include information such as last pull request, last commit, person who made the last commit, last updated, etc.

Returning to FIG. 4, once the gateway module 206 receives content from the data source (at step 434) it forwards this to the object resolver 202, which in turn forwards the data to the smart link client application 126 at step 436.

Figure 7:
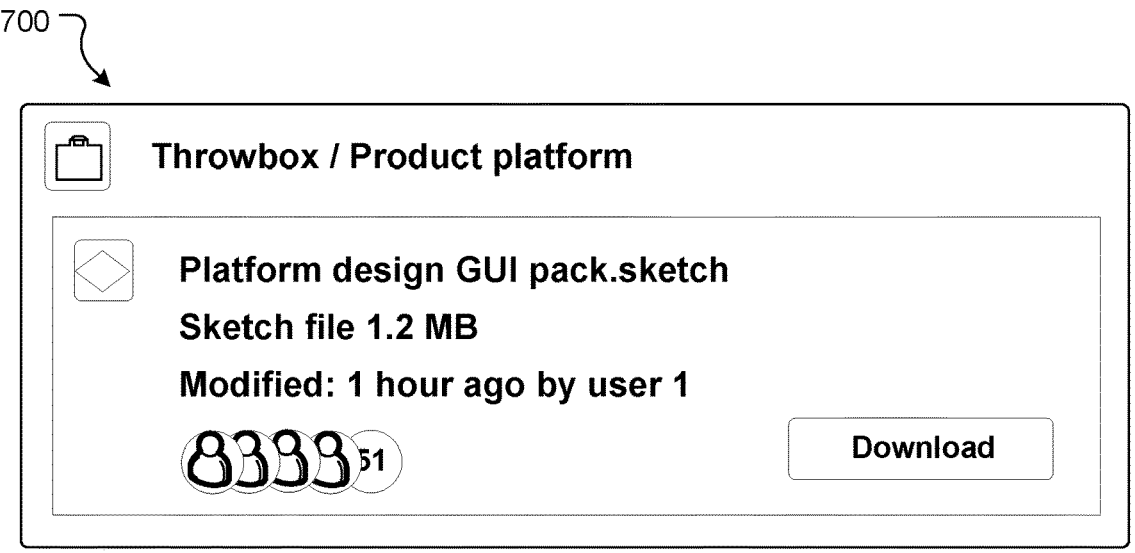
FIG. 7 is an example smart link according to some embodiments of the present disclosure.

The smart link client application 126 in turn renders content for the smart link placeholder and displays the content in the smart link placeholder (at step 438). FIG. 7 illustrates an example smart link card 700 that is rendered based on the received content at this step.

The information displayed in the smart link card 700 and the particular way in which the information is displayed may vary depending on the types of information being displayed, the data source, and/or the operating system of the device on which the client application is operating. For example, the smart link card may look different when it is rendered in a dedicated client application 120 running on an iOS platform as opposed to when it is rendered in a web browser. Further, the smart link card 700 for a document may look different from a smart link card 700 for a repository.

In certain embodiments, the smart link client application 126 maintains a number of different display formats for different 'types' of referenced content and different types of environments (such as iOS, Android, or web browser). Accordingly, when the content is retrieved from the data source, the smart link client application 126 determines the 'type' of the referenced content. In case the content is received as structured metadata, the smart link client application may make this determination based on a lookup in the '@type' field of the metadata file. It can then retrieve the corresponding display format suitable for that type of data and the type of environment in which the client application 120 is executing. The smart link client application 126 then maps the 'field' values of the received metadata file with the field values for that particular display format.

It will be appreciated that the smart link client application 126 may not utilize all the metadata received in the metadata file. Instead, it may only utilize a selected number of fields. Further, the amount of data displayed and therefore the amount of metadata consumed from the received metadata may also vary depending on the type of smart link displayed—i.e., an inline link or a card link. In-line cards may only display an icon and a title, whereas smart link cards may display additional information such as when the content was last updated, who updated the content, and graphical interactive elements for any actions that can be performed on the content directly from the smart link.

Figure 8:
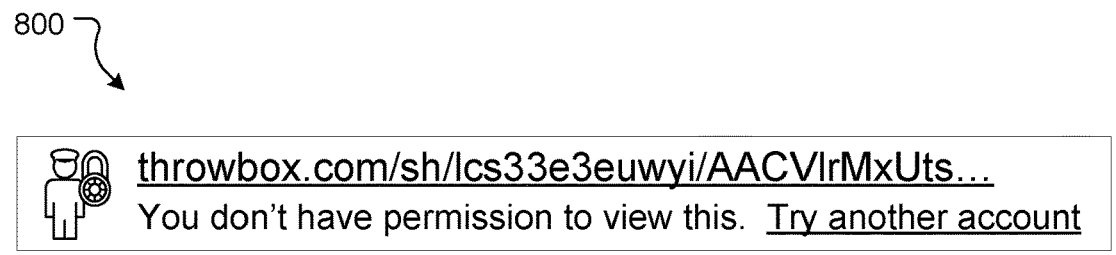
FIG. 8 is an example smart link placeholder according to some embodiments of the present disclosure.

Returning to step 432, if the permission corresponding to the received access key is not sufficient to grant access to the content of the URL (e.g., because the user does not have access to the particular resource), the data source 106 determines that access should not be granted at step 432 and the method proceeds to step 440 where the data source 106 generates and forwards a message to the gateway module 206 informing the gateway module 206 that the user does not have access to the resource. This message is routed back via the object resolver 202 to the client device 108 at step 442. Upon receiving the message (at step 444), the smart link client application 126 generates an error message in the smart link placeholder informing the user that access to the resource is forbidden. In certain embodiments, the error message may notify the user that the user's current account is not authorized to access the resource and the user can try to connect via a different user account. FIG. 8 illustrates an example smart link placeholder 800 indicating that the resource is forbidden and/or that the user does not have sufficient permissions to access the underlying URL and that the user can try a different account.

If the user decides to try a different account, the user selects this option from the smart link card at step 446 and the method proceeds to step 908 of method 900 (which will be described later on).

In case the user does not wish to access the smart link with another user account (at step 446) or if that option is not provided, the smart link 800 may subsequently be replaced by the original text URL. Alternatively, the smart link with the error message may remain displayed. If the user is in the process of creating content, the user may choose to delete the text URL and/or the smart link 800.

The process so far describes the situation where the SLMS 102 has permission to retrieve restricted content on behalf of a user. However, as described previously, in some cases, the SLMS 102 may not have the required permissions. In this case, the SLMS 102 is configured to initiate and guide the user through an authorization and authentication process to obtain an access key.

Figure 9:
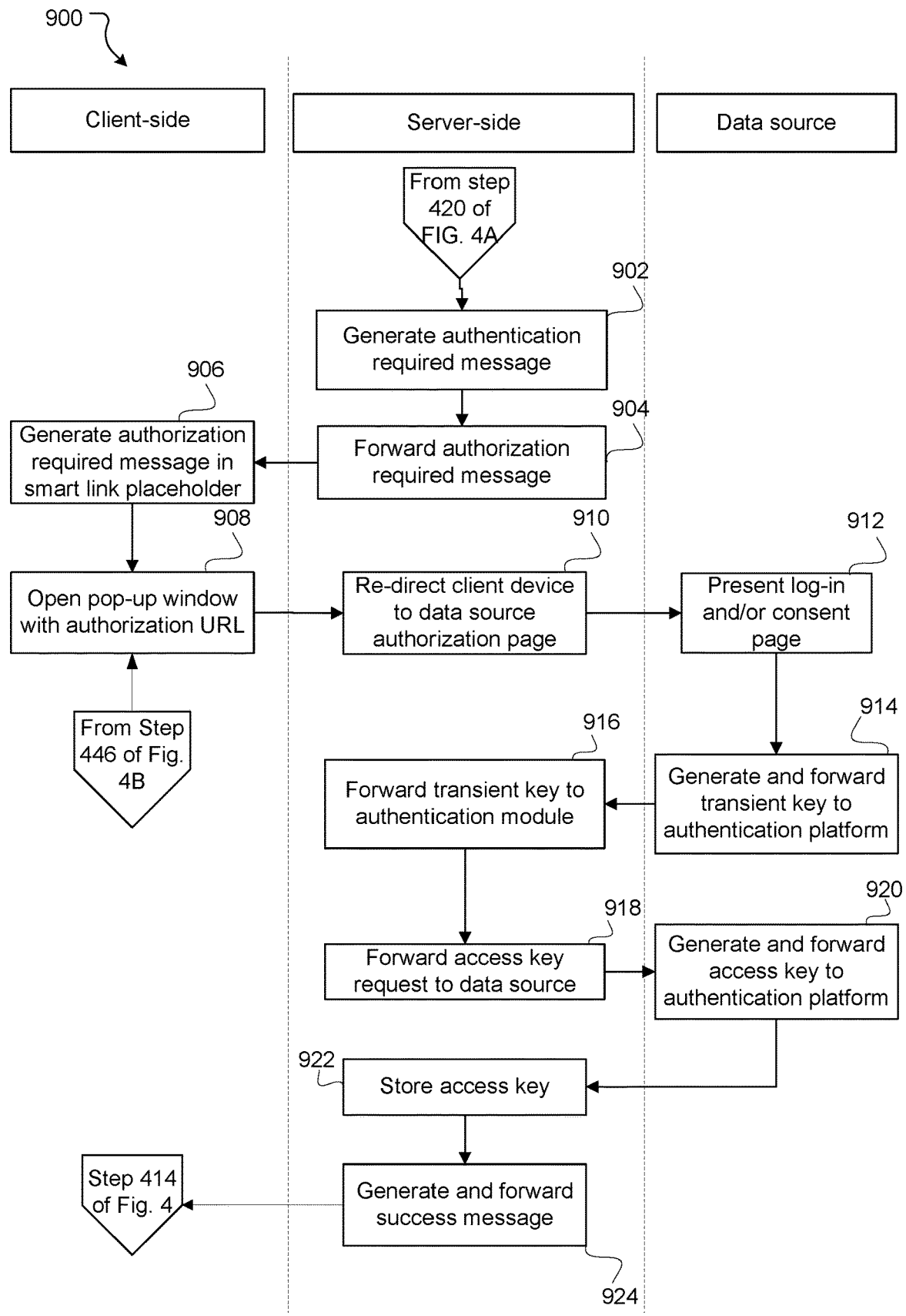
FIG. 9 is a flowchart illustrating a method for displaying a smart link when authorization is required according to some embodiments of the present disclosure.

This process is described with reference to FIG. 9. In particular, the process depicted in FIG. 9 illustrates the process performed after step 420 of method 400, when the gateway module 206 cannot find any access keys associated with the user and data source pair.

Figure 10:
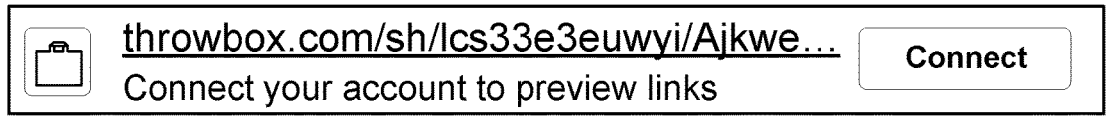
FIG. 10 is an example smart link placeholder according to some embodiments of the present disclosure.

The method begins at step 902, where the gateway module 206 generate and forward a message to the object resolver 202 that indicates that authorization is required to access the content identified by the URL This message is then forwarded by the object resolver 202 to the client device 108 at step 904. Next (at step 906), the smart link client application 126 updates the smart link placeholder to inform the user that the resource is restricted, and the user has to authorize SLMS 102 to retrieve content on behalf of the user. In one example, the smart link placeholder may be updated as shown in FIG. 10 along with an interactive graphical element requesting the user to connect with the data source 106. This interactive graphical element points to the authorization flow module 210.

If the user decides to proceed (i.e., connect with the data source 106), the smart link client 126 and the authorization flow module 210 may commence an authorization process. In certain embodiments, this authorization process is based on the OAuth 2.0 standard.

Accordingly, at step 908, when the smart link client application 126 detects that the user has selected the interactive graphical element to connect with the data source, the smart link client application 126 opens a pop-up window (at step 908). The opening of the pop-up window starts the authorization flow module 210 of the SLMS 102, which initiates the authorization process with the data source 106. In particular, at step 910, the authorization flow module 210 redirects the client device 108 to the data source's user login and/or authorization service.

In order to redirect the client device 108 to the data source's authorization service, the authorization flow module 210 needs to know at least the authorization URL (i.e., the address of the data source's authorization service) and the client ID of the SLMS 102. This information is stored in the authorization module 208. Accordingly, at this step, the authorization flow module 210 requests the authorization module 208 to send it the authorization URL and the client ID of the SLMS 102 for that particular data source 106. The authorization module 208 retrieves this information from the container associated with that particular data source and forwards the information to the authorization flow module 210. Once the authorization flow module 210 has this information it provides the client ID to the data source's authorization service and redirects the client device to an authorization page hosted by the authorization server (at the location pointed by the authorization URL).

If the user is not already logged in, the user may enter their log-in details (to log into the data source 106) via the authorization page at step 912. Once the user is logged in or if the user is already logged in, the authorization web page directs the user to a consent page where the user is advised that the SLMS 102 would like to access the user's data source account to view and retrieve content from the data source that the user has access to. The user may then accept or decline to provide consent.

If the user is logged in and provides their consent (at step 912), the authorization service of the data source 106 generates and forwards a transient key (e.g., one time password/code/token valid for 60 seconds) to the authorization flow module 210 at step 914 and redirects the client device back to the authorization flow module 210. The authorization flow module 210 in turn forwards this transient key to the authorization module 208 at step 916.

Next (at 918), the authorization module 208 generates an access key request to forward to the data source 106. The access key request includes the transient key received from the data source's authorization service and the client ID.

Upon receiving the access key request, if the authorization service of the data source determines that the client ID and transient key are valid, it generates a an access key corresponding to the user and requesting entity (i.e., the SLMS 102) and forwards this access key back to the authorization module 208 at step 920.

In turn, the authorization module 208 stores the access key against a particular user identifier and data source identifier at step 922 and forwards a success message to the authorization flow module 210. In embodiments where the authorization module 208 maintains containers for each data source, the access key is stored in the container corresponding to that particular data source against the user ID of the user that commenced the authorization process.

Once the access key is stored, the authorization flow module 210 generates and forwards an authentication success message to the smart link client application (at step 924), which closes the pop-up window. Thereafter, the method 900 proceeds to step 414 of method 400, i.e., the client device generate and forwards a content request to the SLMS 102.

As described in detail with respect to FIG. 4, the request is then channeled from the object resolver 202 to the gateway module 206. The gateway module 206 retrieves the newly added access key for the user and the data source from the authorization module 208 and forwards this access key along with the URL for which content is requested to the data source 106. The data source determines whether the user is allowed to access the restricted source based on the received access keys and if it is determined that access should be granted, the data source 106 responds with the content (e.g., the metadata associated with the resolved URL).

The method depicted in FIG. 9 and described above assumes that the user provides the correct login details and consents to authorizing the SLMS 102. In case the user login details are incorrect or the user does not consent, the authorization service of the data source 106 does not generate and forward the short duration identifier at step 932. Instead, it ends the authorization process by generating an error message, which is forwarded to the authorization flow module 210. The authorization flow module 210 in turn may display an error message in the pop-up window informing the client that the authorization process has failed. The pop-up window in this case may close and the smart link may display the error message shown in FIG. 8 or FIG. 10.

The process so far describes the situation where the external content is restricted and not publicly available. However, in some cases, users may wish to reference external content that is publicly available (e.g., a Wikipedia page, the current stock exchange prices, a company website, etc.). In such cases, a simpler process may be adopted to retrieve content from the data source 106, without involvement of the authentication platform 103.

Figure 11:
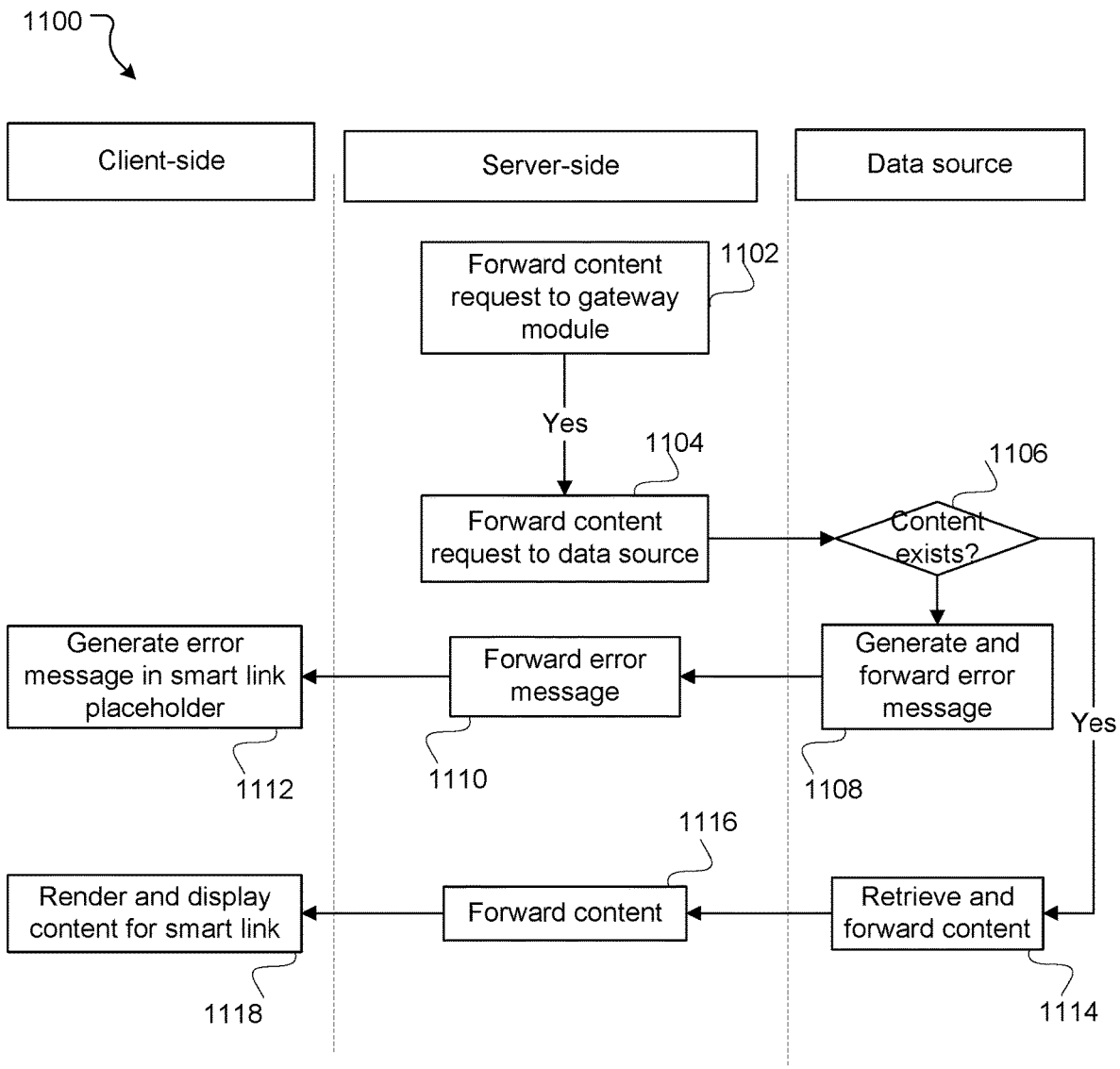
FIG. 11 is a flowchart illustrating an example method for displaying a public smart link according to some embodiments of the present disclosure.

This process is described with reference to FIG. 11. In particular, the process depicted in FIG. 11 illustrates the process performed after step 416 of method 400, when the object resolver 202 determines that the URL is a public resource.

At step 1102, the SLMS 102 and in particular the object resolver 202, requests the gateway module 206 to retrieve content from the associated data source. This request may include the URL for which content is requested and the data source identifier of the corresponding data source (retrieved from the data source registry 204).

At step 1104, the gateway module 206 generates and forwards a content request to the data source 106. This request includes the URL for which content is required. In one example, the gateway module 206 may use an HTML POST message to forward the request to the data source 106 and Table C illustrates an example body of the POST message.

TABLE C

| example content request message |
|---|
| { <br>   "body": { <br>     "resourceUrl": "https://url.to.be/resolved" <br>   } <br> } |

As described previously, a data source 106 may provide a particular endpoint for servicing content requests for smart links. This endpoint, also referred to as a resolve URL, is stored in the data source's descriptor in the data source registry 204. The gateway module 206 retrieves the resolve URL and forwards the content request to the endpoint corresponding to the resolve URL (which may point to the translation module 212 or an API of the data source).

At step 1106, the data source 106 determines whether the URL exists (e.g., whether the content has been removed and/or whether the URL has been deleted). If the URL has been deleted, an error message is generated and forwarded back to the gateway module 206 at step 1108.

This error message is routed back to the object resolver 202 and the smart link client application 126 at step 1110. The client application 126 in turn displays an error message in the smart link placeholder at step 1112 informing the user that the link cannot be found.

If at step 1106, it is determined that the URL exists, the data source 106 retrieves the requested content and forwards this to the gateway module 206 at step 1114. This step is similar to step 432 to FIG. 4 and therefore is not described in detail here.

Once the gateway module 206 receives content from the data source (at step 1116) it forwards this to the object resolver 202, which in turn forwards the data to the smart link client application 126.

The smart link client application 126 in turn renders content for the smart link placeholder and displays the content in the smart link placeholder (at step 1118). Again, this step is similar to step 438 of FIG. 4 and is therefore not described in any more detail here.

Method 400 describes the process for displaying smart links when a user enters/types/pastes a URL in the content editor 124. When a user views content via client application 120, which has smart links, the process is slightly different. In this case, the content already includes smart link placeholders within the content. Whenever a portion of the content that includes a smart link is rendered on the display of the client device, the smart link application 126 generates a content request for the rendered smart link placeholder (similar to step 414 of FIG. 4A). Thereafter the method steps for displaying the smart link is the same as that described with reference to FIGS. 4-11. Accordingly, when a user views content that includes smart links, the process for displaying smart links starts at step 414 and steps 402-412 are omitted.

Performing Actions via Smart Links

As described previously, in some cases, the smart link client application 126 may be able to generate actionable interactive graphical elements on the displayed smart link. Users may interact with these graphical elements to perform actions on the underlying content/data of the original URL. As smart links typically provide little context or information about the underlying content, the actions are primarily "light weight" and are provided to allow users to move work forward without requiring full context information. The actions can be transformative—where the action performed updates the referenced resource (e.g., an approve/reject action, or an action to promote a build to the next stage). Alternatively, actions can be non-transformative—where the action can be performed multiple times without changing the state of the underlying resource (e.g., sharing or downloading the resource).

When an action is successfully performed, the smart link client application 126 provides some type of visual indication to inform the user that the action has been completed. For example, in case a transformative action is performed, the smart link client application 126 may change or inactivate the interactive action button of the smart link. Similarly, when a non-transformative action is performed, a visual indicator may be provided to indicate that the action is performed.

Figure 12:
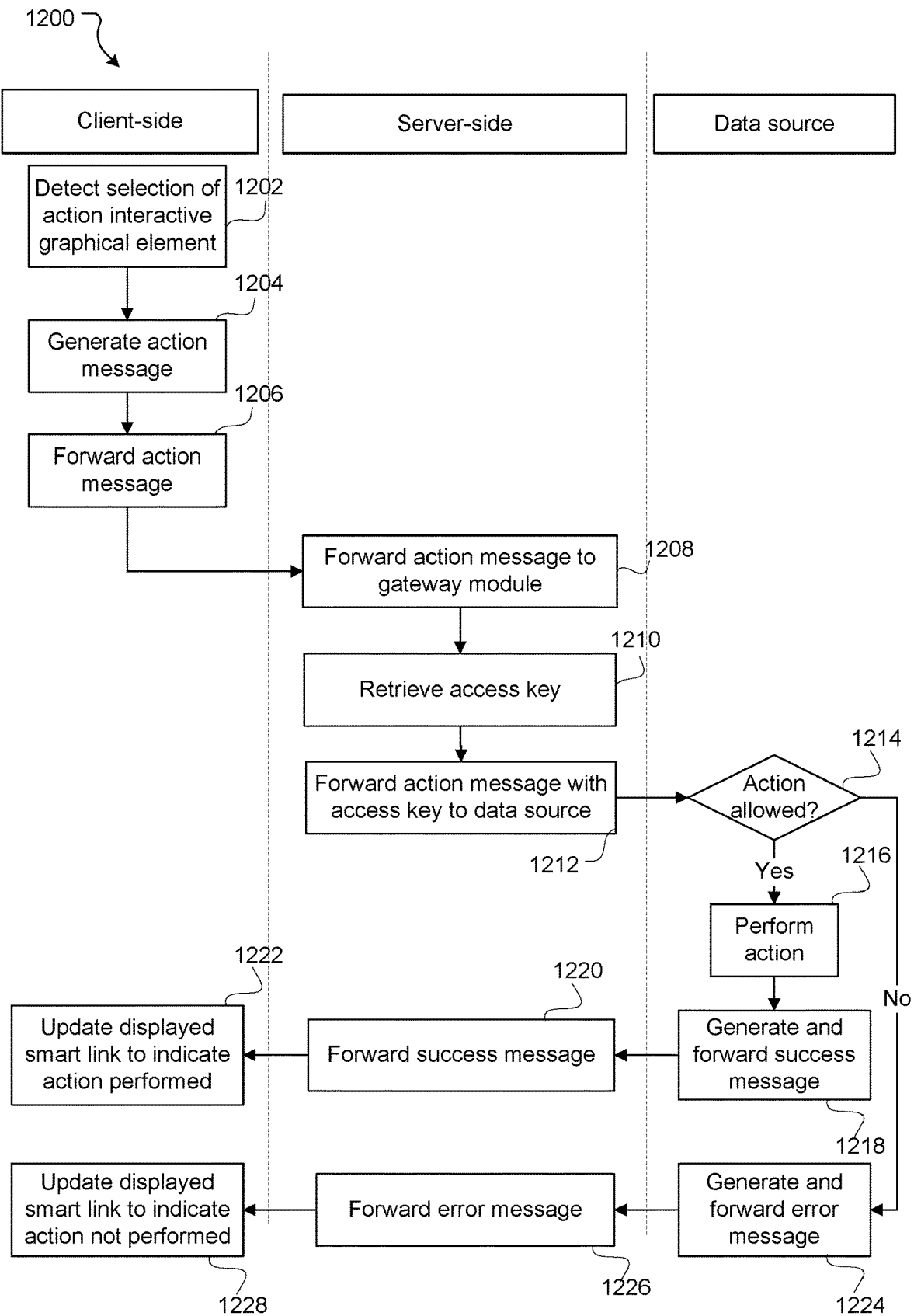
FIG. 12 is a flowchart illustrating a method for performing an action in a smart link according to some aspects of the present disclosure.

FIG. 12 illustrates an example method 1200 for performing a transformative action via a smart link.

Figure 13:
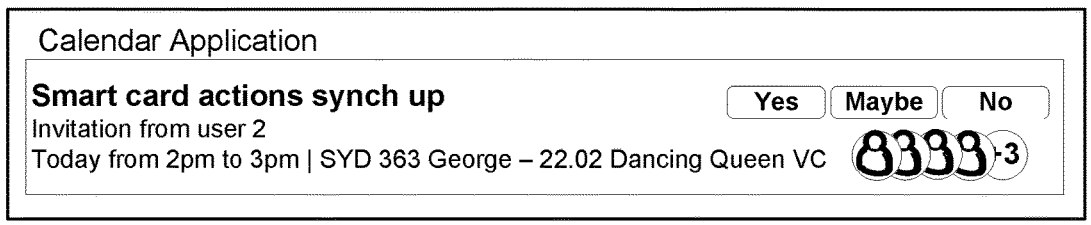
FIG. 13 is an example smart link according to some embodiments of the present disclosure.

In certain embodiments, the method 1200 begins after step 438 or 118 (i.e., after a smart link is rendered and displayed in the client application 120 on the client device 108). To aid in description of this process, an example smart link is considered that includes an interactive graphical element representing a transformative action that may be performed on the external content. It will be appreciated that the smart link need not always include an actionable item, let alone a transformative actionable item. FIG. 13 illustrates an example smart link of this type which is generated for a calendar invite URL. In addition to displaying the subject of the invite, the date, time and location of the event and the attendees, the event smart link 1300 also includes three actionable graphical elements that allow the user to either decline, accept or tentatively accept the event invite.

At step 1202, the smart link client application 126 detects selection of a particular actionable graphical element. In response, the smart link client application identifies the action corresponding to the selected graphical element and generates an action message at step 1204. The message includes the action that the user wishes to perform, a user identifier, the URL for which the action is to be performed, and an identifier for the data source corresponding to the smart link. This message is forwarded to the SLMS 102 at step 1206.

At step 1208, the object resolver 202 forwards the action message to the gateway module 206. This request may include the URL for which the action is to be performed, the data source identifier of the corresponding data source (retrieved from the data source registry 204), and the user identifier.

At step 1210, the gateway module 206 retrieves the access key for the particular pair of user identifier and data source identifier from the authorization module 208. This is similar to step 420 of FIG. 4A. At step 1212 the gateway module 206 generates and forwards the action message to the data source 106. This message includes the URL for which the action has to be performed and the access key for the user/data source pair. In one example, the gateway module may use an HTML POST message to forward the message to the data source and Table D illustrates an example body of the POST message.

TABLE D example action request message

```
{
    "_meta": {
        "tokens": [
            { "token": "access key" },
        ]
    },
    "body": {
        "resourceUrl": "https://url.to.be/resolved",
        "action": { }
    }
}
```

Typically, a data source 106 may provide a particular endpoint for servicing action requests for smart links. This endpoint, also referred to as an action URL, is available in the data source's descriptor in the registry 204. The gateway module 206 retrieves the action URL and forwards the action message to the endpoint corresponding to the action URL. As described previously, in case a translation module 212 is associated with a data source, the action URL may point to the translation module 212 instead of the data source 106.

It will be appreciated that sometimes a user may have permission to view a particular smart link (because the user has view permissions for the underlying content), but the user may not have sufficient permission to modify/write to the underlying content. Accordingly, at step 1214, the data source 106 determines whether the user is allowed to perform the action. In a particular embodiment, the data source 106 checks if the access keys present in the action message are sufficient to allow the action to be performed.

As described previously, the data source 106 maintains a permissions database 128 that includes access keys and corresponding permissions associated with those access keys. Accordingly, at this step, the data source 106 compares the received access key with the access keys stored in its permission database 128 to determine whether the user has permission to perform the action.

If the permission corresponding to the received access key is sufficient to perform the action, the data source 106 determines that the user is permitted to perform the action at step 1214 and the method proceeds to step 1216 where the data source 106 performs the action on the data present at the URL. Once the action has been successfully performed, the data source 106 may forward a success message to the SLMS 102 at step 1218.

This message is forwarded from the SLMS 102 to the smart link client application 126 at step 1220.

The smart link client application 126 in turn updates the smart link at step 1222 to reflect that the action has been successfully performed. For example, in case of the smart link depicted in FIG. 13, if the action to perform was to say "yes' to the event, the smart link client 126 may update the smart link 1300 to remove the "no" and "maybe" graphical elements and convert the interactive graphical element for "yes" into a non-interactive graphical element that indicates that the invite has been "accepted".

Alternatively, if at step 1214 it is determined that the user does not have permission to perform the action, an unsuccessful message is generated at step 1224 and passed back to the client device (via the SLMS 102) at steps 1226 and 1228, respectively.

The smart link client 126 may then update the smart link to indicate that the user is not permitted to perform the action (e.g., by removing the action buttons) or may indicate that the action was unsuccessful in some other manner.

In some cases, although the user may have permission to perform the action, the action may nonetheless not be successfully performed (e.g., because the action is no longer available at the source, the action has already been performed by another user, or the data source timed out). In such cases, the data source may generate and forward a suitable error message to the client device 108 to inform the user that the action was not successfully performed. In some cases, the user may be given the option to try again and in other cases the action graphical elements may be removed from the smart link. It will be appreciated that these are only two possible ways and that other techniques may also be contemplated to inform the user that the action was unsuccessful, and these other techniques are within the scope of the present disclosure.

Furthermore, in some cases if the user is not allowed to perform the action, the smart link client application 126 may allow the user to try performing the action with a different account. In this case, the smart link client application may display a user interface similar to that shown in FIG. 8.

The method 1200 is described for cases where the authorization module 208 already has an access key associated with the user and therefore at step 1210 the gateway module 206 simply retrieves the access key associated with the user ID and that particular data source. However, in some cases, for example, where the SLMS 102 did not require authorization to display the content on behalf of the user (e.g., because the content was open for viewing to the public), the authorization module 208 may not have an access key for that user/data source pair. In such cases, the method described with reference to FIGS. 4B and 9 may be employed. Specifically, the gateway module 206 may submit the action request without the access key. At the data source, the data source may determine if the action can be performed without permission. If permission is not required, the action may be performed. However, if permission is required, the data source may generate a message similar to the message generated at step 920. The smart link client 126 in turn may generate and render a message in the smart link informing the user that authorization is required to perform this action (similar to the message generated at step 924). Thereafter, the authorization process (as shown in FIG. 9) may be initiated if the user decides to authorize the SLMS 102 to perform the action on behalf of the user.

By using a two layer architecture in the SLMS (i.e., an object resolver 202 that is configured to communicate with the client device 108 and a gateway module 206 that is configured to communicate with the data sources 106 and/or translation modules 212), the SLMS 102 provides security. This is because the access keys are never shared with the object resolver 202 or the client device 108. Instead, the access keys are only ever shared between the gateway module 206 and the authorization module 208. Further, the object resolver 202 does not have direct access to the authorization module 208 and therefore cannot access the access keys stored in that authorization module. This way, even if a client application 120 is hacked, it is difficult for the client application 120 to retrieve access keys or other confidential information stored on the SLMS 102.

Further, the smart links are generated in real time whenever the user views a page containing external referenced content. This way, the data depicted in the smart link is always up to date.

The methods described above clearly distinguish between the functionality of the server-side components (i.e., the SLMS 102 and the authentication platform 103) and client-side components of the smart link management system. However, in some cases, some of the functions that are described as being performed by the smart link client application 126 may be performed by the SLMS 102 vice versa. For example, in some cases, the smart link client application may be a thin client configured to only send requests and render smart links. In this case the functionality of converting the metadata file into visual objects may be performed at the server and the server may send data to render the visual objects to the client. In other cases, the smart link client application 126 may be configured to determine whether the data source is supported by the smart link management system by directly querying the data source registry itself. In this case, one or more of the steps 404-409 may either be omitted or performed by the smart link client application 126.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A method for providing an electronic document of a product platform, the method comprising:
   receiving, at the product platform and from a content editor of a first client device, a first request to insert user-generated content into the electronic document;
   receiving, at the product platform and from the content editor, a second request to insert a smart link into the electronic document, the smart link including a network path to a referenced object;
   storing the electronic document at the product platform;
   subsequent to storing the electronic document, receiving, at the product platform and from a second client device operated by a user, a request to view the electronic document;
   in accordance with a determination that the user is authorized to access the referenced object:
      receiving, at the product platform, metadata corresponding to the referenced object; and
      causing the second client device to display at least a portion of the electronic document including the smart link in line with the user-generated content, the smart link including the received metadata and selectable to cause redirection to the referenced object; and
   in accordance with a determination that the user is not authorized to access the referenced object, causing the second client device to display at least a portion of the electronic document including the user-generated content and an error message in line with the user-generated content of the electronic document instead of the smart link.

2. The method of claim 1, wherein the request to view the electronic document further comprises information for identifying the user operating the second client device.

3. The method of claim 1, wherein:
   the error message includes a selectable login element; and
   the method further comprises, in response to receiving a selection of the login element, initiating an authorization operation to authorize the user to access the referenced object.

4. The method of claim 3, further comprising:
in response to receiving the request to view the electronic document, determining whether the referenced object is associated with a restricted data source; and
in accordance with a determination that the referenced object is associated with a restricted data source, determining whether the user is authorized to access the referenced object.

5. The method of claim 4, wherein determining whether the user is authorized to access the referenced object includes:
determining whether an access key corresponding to the user and to the restricted data source is stored in an authentication platform;
upon determining that the access key is stored in the authentication platform, retrieving the access key from the authentication platform; and
forwarding the access key along with the request to view the electronic document to the restricted data source.

6. The method of claim 5, further comprising:
upon determining that the access key is not stored on the authentication platform:
generating and forwarding an error message to the second client device; and
initiating an authorization process with the restricted data source to generate the access key, for the restricted data source, for the user requesting to view the electronic document.

7. The method of claim 1, wherein:
the request to view the electronic document is a first request to view the electronic document;
the smart link is a first smart link;
the referenced object is a first referenced object;
the metadata is first metadata;
the error message is a first error message; and
the method further comprises:
receiving, at the product platform and from the content editor, a third request to insert a second smart link into the electronic document, the second smart link including a second network path to a second referenced object;
receiving, at the product platform and from a third client device operated by a second user, a second request to view the electronic document;
in accordance with a determination that the second user is authorized to access the second referenced object:
receiving, at the product platform, second metadata corresponding to the second referenced object; and
causing the third client device to display at least a portion of the electronic document including the second smart link in line with the user-generated content, the second smart link including the received second metadata and selectable to cause redirection to the second referenced object; and
in accordance with a determination that the second user is not authorized to access the second referenced object, causing the third client device to display at least a portion of the electronic document including the user-generated content and a second error message in line with the user-generated content in the electronic document instead of the second smart link.

8. A system for providing an electronic document of a product platform in communication with a plurality of client devices, the system comprising a processor and a memory, the memory comprising instructions, which when performed by the processor cause the system to:
receive, at the product platform and from a content editor of a first client device, a first request to insert user-generated content into the electronic document;
receive, at the product platform and from the content editor, a second request to insert a smart link into an electronic document, the smart link including a network path to a referenced object;
store the electronic document at the product platform;
subsequent to storing the electronic document, receive at the product platform and from a second client device operated by a user, a request to view the electronic document;
in accordance with a determination that the user is authorized to access the referenced object:
receive, at the product platform, metadata corresponding to the referenced object; and
cause the second client device to display at least a portion of the electronic document including the smart link in line with the user-generated content, the smart link including the received metadata and selectable to cause redirection to the referenced object; and
in accordance with a determination that the user is not authorized to access the referenced object, cause the second client device to display at least a portion of the electronic document including the user-generated content and an error message in line with the user-generated content of the electronic document instead of the smart link.

9. The system of claim 8, wherein the request to view the electronic document further comprises information for identifying the user operating the second client device.

10. The system of claim 8, wherein:
the error message includes a selectable login element; and
the instructions further cause the system to, in response to receiving a selection of the login element, initiating an authorization operation to authorize the user to access the referenced object.

11. The system of claim 10, wherein the instructions further cause the system to:
in response to receiving the request to view the electronic document, determine whether the referenced object is associated with a restricted data source; and
in accordance with a determination that the referenced object is associated with a restricted data source, determine whether the user is authorized to access the referenced object.

12. The system of claim 11, wherein determining whether the user is authorized to access the referenced object includes:
determining whether an access key corresponding to the user and to the restricted data source is stored in an authentication platform;
upon determining that the access key is stored in the authentication platform, retrieving the access key from the authentication platform; and
forwarding the access key along with the request to view the electronic document to the restricted data source.

13. The system of claim 12, wherein the instructions further cause the system to:
upon determining that the access key is not stored on the authentication platform:
generate and forwarding an error message to the second client device; and initiate an authorization process with the restricted data source to generate the access key, for the restricted data source, for the user requesting to view the electronic document.

14. The system of claim 8, wherein:
the request to view the electronic document is a first request to view the electronic document;
the smart link is a first smart link;
the referenced object is a first referenced object;
the metadata is first metadata;
the error message is a first error message; and
the instructions further cause the system to:
   receive, at the product platform and from the content editor, a third request to insert a second smart link into the electronic document, the second smart link including a second network path to a second referenced object;
   receive, at the product platform and from a third client device operated by a second user, a second request to view the electronic document;
   in accordance with a determination that the second user is authorized to access the second referenced object:
      receive, at the product platform, second metadata corresponding to the second referenced object; and
      cause the third client device to display at least a portion of the electronic document including the second smart link in line with the user-generated content, the second smart link including the received second metadata and selectable to cause redirection to the second referenced object; and
   in accordance with a determination that the second user is not authorized to access the second referenced object, cause the third client device to display at least a portion of the electronic document including the user-generated content and a second error message in line with the user-generated content in the electronic document instead of the second smart link.

15. A non-transitory computer readable medium comprising instructions which when executed by a processor cause a system to:
receive, at a product platform in the system and from a content editor of a first client device, a first request to insert user-generated content into an electronic document of the product platform;
receive, at the product platform and from the content editor, a second request to insert a smart link into an electronic document, the smart link including a network path to a referenced object;
store the electronic document at the product platform;
subsequent to storing the electronic document, receive at the product platform and from a second client device operated by a user, a request to view the electronic document;
in accordance with a determination that the user is authorized to access the referenced object:
   receive, at the product platform, metadata corresponding to the referenced object; and
   cause the second client device to display at least a portion of the electronic document including the smart link in line with the user-generated content, the smart link including the received metadata and selectable to cause redirection to the referenced object; and
in accordance with a determination that the user is not authorized to access the referenced object, cause the second client device to display at least a portion of the electronic document including the user-generated content and an error message in line with the user-generated content of the electronic document instead of the smart link.

16. The non-transitory computer readable medium of claim 15, wherein the request to view the electronic document further comprises information for identifying the user operating the second client device.

17. The non-transitory computer readable medium of claim 15, wherein:
the error message includes a selectable login element; and
the instructions further cause the system to, in response to receiving a selection of the login element, initiating an authorization operation to authorize the user to access the referenced object.

18. The non-transitory computer readable medium of claim 17, wherein the instructions further cause the system to:
in response to receiving the request to view the electronic document, determine whether the referenced object is associated with a restricted data source; and
in accordance with a determination that the referenced object is associated with a restricted data source, determine whether the user is authorized to access the referenced object.

19. The non-transitory computer readable medium of claim 18, wherein determining whether the user is authorized to access the referenced object includes:
determining whether an access key corresponding to the user and to the restricted data source is stored in an authentication platform;
upon determining that the access key is stored in the authentication platform, retrieving the access key from the authentication platform; and
forwarding the access key along with the request to view the electronic document to the restricted data source.

20. The non-transitory computer readable medium of claim 19, wherein the instructions further cause the system to:
upon determining that the access key is not stored on the authentication platform:
   generate and forwarding an error message to the second client device; and
   initiate an authorization process with the restricted data source to generate the access key, for the restricted data source, for the user requesting to view the electronic document.

\* \* \* \* \*